(12) United States Patent
Hochmuth et al.

(10) Patent No.: US 6,267,218 B1
(45) Date of Patent: Jul. 31, 2001

(54) CLAMP-TYPE LOCKING MECHANISM

(75) Inventors: Harald Hochmuth, Hagenbüchach; Joachim Ritter, Herzogenaurach, both of (DE)

(73) Assignee: Ina Wälzlager Schaeffler oHG, Herzogenaurach (DE)

( * ) Notice: Subject to any disclaimer, the term of this patent is extended or adjusted under 35 U.S.C. 154(b) by 0 days.

(21) Appl. No.: 09/522,774

(22) Filed: Mar. 8, 2000

Related U.S. Application Data

(60) Provisional application No. 60/124,229, filed on Mar. 12, 1999.

(51) Int. Cl.[7] ............................. F16D 41/10; B60N 2/22
(52) U.S. Cl. ..................................... 192/223.2; 192/111 A
(58) Field of Search ..................... 192/223.2, 44, 192/111 A; 297/374

(56) References Cited

U.S. PATENT DOCUMENTS

| | | | |
|---|---|---|---|
| 3,243,023 | * | 3/1966 | Boyden ............................. 192/223.2 |
| 5,248,017 | * | 9/1993 | Schwarzbich ..................... 192/223.2 |
| 5,896,973 | * | 4/1999 | Hochmuth et al. ................ 192/223.2 |
| 6,066,097 | * | 5/2000 | Kurita ................................... 192/27 |

FOREIGN PATENT DOCUMENTS

WO 96/20352   7/1996   (WO) .

* cited by examiner

*Primary Examiner*—Richard M. Lorence
(74) *Attorney, Agent, or Firm*—Henry M. Feireisen

(57) ABSTRACT

A clamp-type locking mechanism has a driven element rotatably arranged with respect to a holding element and having ramps which together with a track of the holding element define clamping gaps for receiving spring-loaded clamp rollers. An adjustment element is swingable to a limited extent with respect to the driven element and provided for rotation in unison with the driven element, with the adjustment element having engagement members for moving the clamp rollers out of their clamping gaps. Located between the driven element and the holding element is a friction device for transmitting a friction moment. In order to maintain a correct friction moment during wear of the friction device, a spring mechanism is provided by which the friction device is biased with its friction surface against the holding element.

9 Claims, 3 Drawing Sheets

# CLAMP-TYPE LOCKING MECHANISM

CROSS-REFERENCES TO RELATED APPLICATIONS

This application claims benefit of prior filed copending provisional application Appl. No. 60/124,229, filed Mar. 12, 1999.

BACKGROUND OF THE INVENTION

The present invention relates to a clamp-type locking mechanism, as used, for example, in seat-height adjustments of motor vehicles.

Conventional locking mechanisms include a rotatable driven element which can be secured with respect to a holding element formed, for example, as housing by means of a releasable clamp connection in one, preferably in both, rotation directions. In case of a seat-height adjustment, a selected seat position can be implemented in this manner. An adjustment element is provided to release the clamp connection and to rotate the driven element with respect to the holding element. Thus, when incorporated in a seat adjustment, a rotation of the driven element results in a modification of the seat position.

A clamp-type locking mechanism is known, for example, from WO-A 96/20352, and includes a driven element which is rotatably received in a housing. Clamping ramps of the driven element and a cylindrical clamping track of the housing define clamping gaps for receiving spring-loaded clamp rollers. An adjustment element is swingable to a limited extent with respect to the driven element and engages between the driven element and the housing. The adjustment element includes engagement members which press the clamp rollers out of their clamping gaps in order to permit a rotation of the adjustment element in unison with the driven element. This clamp-type locking mechanism has furthermore a friction device for transmitting a friction moment between the housing and the driven element. This friction device prevents an undesired stick-slip effect by which the clamp rollers are clamped and released again in rapid sequence. This stick-slip effect may be caused by a torque applied on the driven element and acting in same direction as the adjusting moment introduced into the adjustment element. The friction device is formed here by a friction disk which is positively connected to the driven element and has an outer surface area which bears upon the cylindrical clamping track of the housing. This type of friction device suffers the drawback that the transmitted friction effect decreases as the wear of the friction surface progresses, so that the pressing action between the friction disk and the housing decreases with increasing material wear of the friction disk.

SUMMARY OF THE INVENTION

It is thus an object of the present invention to provide an improved clamp-type locking mechanism, obviating the afore-stated drawbacks.

In particular, it is an object of the present invention to so improve a clamp-type locking mechanism, that a reliable transmission of the friction moment between the driven element and the holding element is insured.

These objects, and others which will become apparent hereinafter, are attained in accordance with the present invention by providing a spring mechanism to load the friction device with its friction surface against the holding element.

The spring mechanism is suitably so configured that the spring rigidity and the spring travel allows self-adjustments of the friction device in response to a wear, thereby ensuring a sufficient contact pressure of the friction surface against the holding element.

The configuration of the friction device is, of course, dependent on the design of the clamp-type locking mechanism. For example, clamp-type locking mechanisms are conceivable in which the holding element has an end face arranged transversely to the rotation axis of the driven element and formed with a planar clamping track, whereas the driven element has an end face arranged transversely to the rotation axis and formed with circumferentially spaced clamping ramps. In this case, the friction surface is formed at an end face of the friction device, whereby the spring mechanism may include, for example, a biased disk spring for pressing the friction surface of the friction device against the planar clamping track.

The present invention is especially suitable for application in a clamp-type locking mechanisms, as disclosed, for example, in the afore-stated WO-A 96/20352. In a clamp-type locking mechanism of this type, the clamping track is formed by a housing wall of a cylindrical recess of a housing, whereby a shaft, which is arranged coaxially in the cylindrical recess, has an outer surface area positioned in facing relationship to the housing wall and including the circumferentially spaced clamping ramps. In this case, the friction surface is provided on the outer surface area of the friction device.

According to another feature of the present invention, the spring mechanism includes a spring-loaded ring, which is breached by an opening, for urging the friction surface of the friction device against the cylindrical clamping track. This results in a simple and particularly cost-efficient configuration.

According to still another feature of the present invention, the spring-loaded ring may have two diametrically opposite areas for receiving friction elements with respective friction surfaces which may be formed by a coating, applied on the ring. It is, however, also possible to provide the friction surfaces in the form of a friction lining which is applied onto the ring. The use of a friction lining is advantageous because wear of the friction lining can easily be compensated through adjusting the biased ring. In order to ensure that the ring and the areas with the friction surfaces are arranged in concentric relationship to the cylindrical clamping track, the ring is suitably provided between the areas with a centering cam which bears upon the cylindrical clamping track.

A clamp-type locking mechanism in accordance with the present invention may, of course, also be so configured that the holding element is formed as fixed axle with cylindrical outer surface area, whereby the axle is received in a bore of the driven element. The driven element is provided in this case at its bore wall with the clamping ramps.

BRIEF DESCRIPTION OF THE DRAWING

The above and other objects, features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
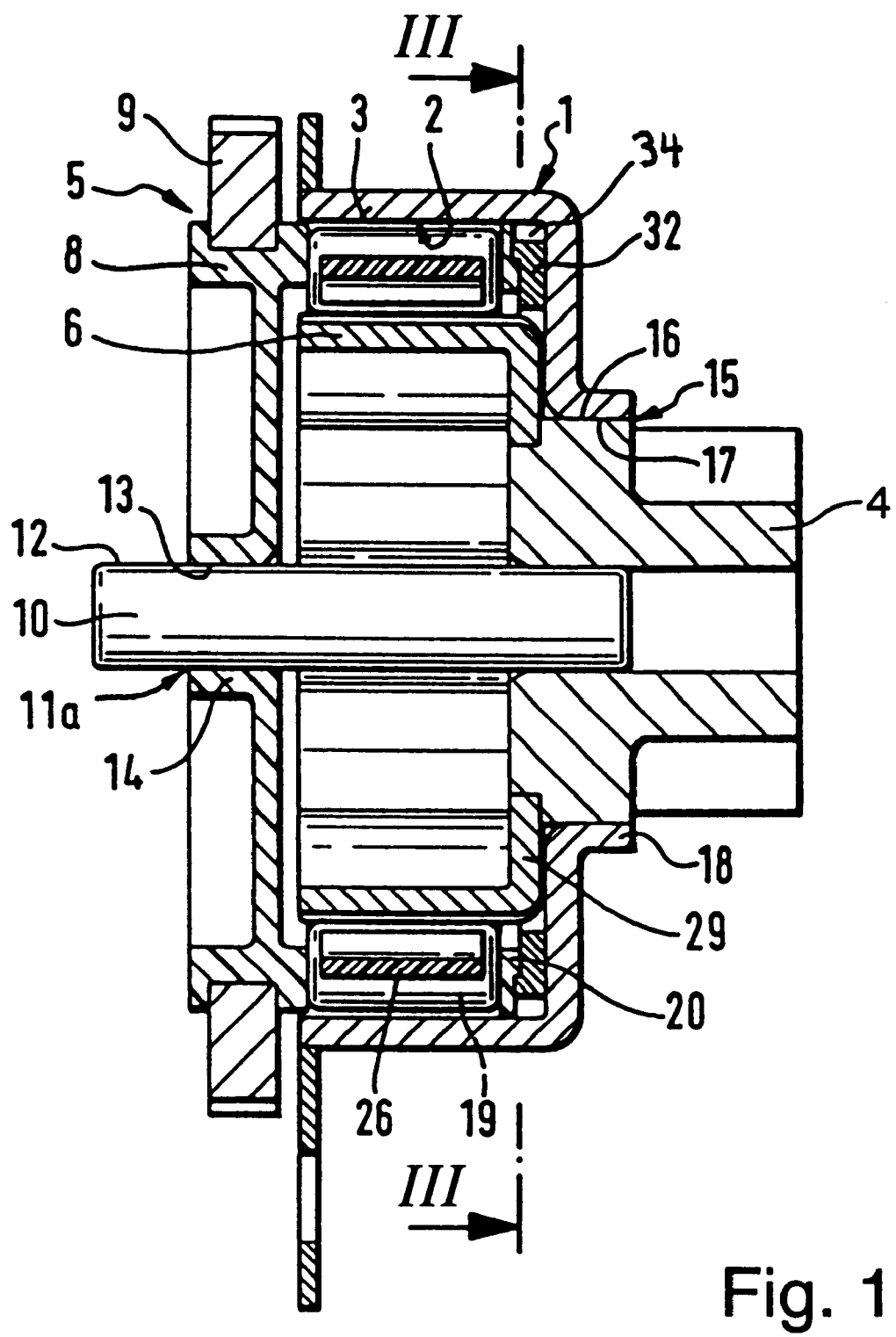
FIG. 1 is a longitudinal section of one embodiment of a clamp-type locking mechanism according to the present invention.

Throughout all the Figures, same or corresponding elements are generally indicated by same reference numerals.

Turning now to the drawing, and in particular to FIG. 1, there is shown a longitudinal section of a clamp-type locking mechanism according to the invention, including a fixed housing, generally designated by reference numeral 1 and forming a holding element. The housing 1 has a bore 2 with a bore wall which defines an inner cylindrical clamping track 3. Arranged coaxially to the bore 2 are a driven element, generally designated by reference numeral 4, and a driving element or adjuster, generally designated by reference numeral 5. The driven element 4 includes an annular closed sheet metal jacket 6 and a driven member 7 which is in fixed rotative engagement with the sheet metal jacket 6. The driving element 5 includes a plastic disk 8 which is in fixed rotative engagement with a driving member 9. A pin 10 is arranged coaxially to the bore 2 and press-fitted in a pin bore 11 of the driven member 7. The plastic disk 8 is rotatably supported by means of a sliding bearing 11a, with the sliding bearing 11a being formed by an outer surface area 12 of the pin 10 and an inner surface area 13 of an axial collar 14 of the plastic disk 8. Provided between the driven member 7 and the housing 1 is a further sliding bearing 15 which is formed by a cylindrical outer surface area 16 of the driven member 7 and an inner surface area 17 of an axial collar 18 of the housing 1. The plastic disk 8 is provided with engagement members or dogs 19 which project axially into the bore 2 and are interconnected in one piece at their end distal to the plastic disk 8 by a ring 20.

Figure 2:
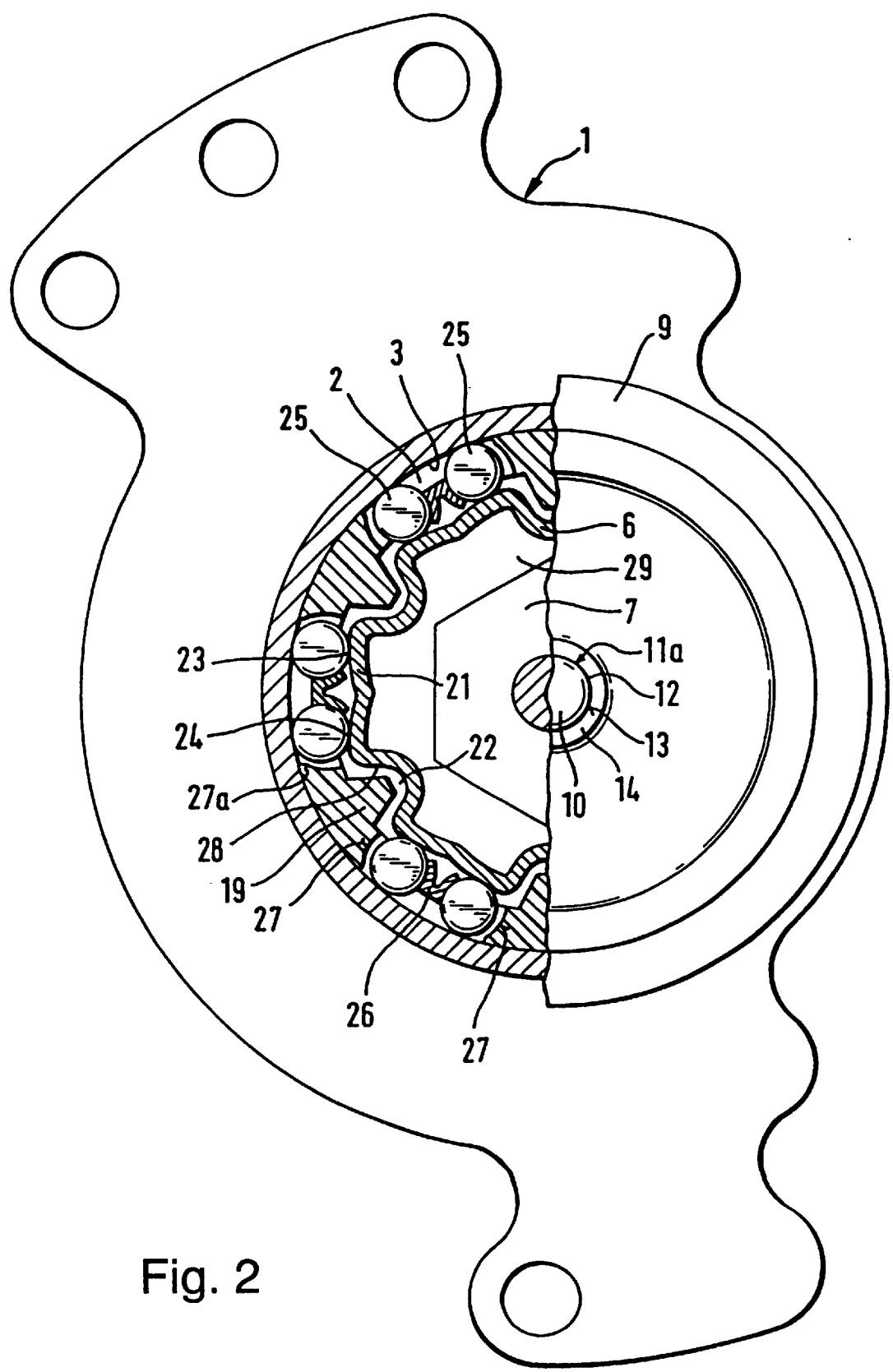
FIG. 2 is a cross-section of the clamp-type locking mechanism of FIG. 1.

As shown in particular in FIG. 2, the sheet metal jacket 6 is formed with circumferentially spaced plateaus 21 and valleys 22 in alternating disposition. Each plateau 21 is provided with two circumferentially neighboring clamping ramps 23, 24 which extend at an obtuse angle and thereby distance themselves from the inner cylindrical clamping track 3. Arranged on each plateau 21 are two clamp rollers 25, with one of the clamp rollers 25 being associated to the clamping ramp 23, and with the other one of the clamp rollers 25 being associated to the clamping ramp 24. Provided between both clamp rollers 25 is a spring element 26 by which both clamp rollers 25 are pressed apart from one another to keep them ready for clamping action with the inner cylindrical clamping track 3 and the clamping ramps 23, 24. The dogs 19 engage the valleys 22 at clearance in the circumferential directions, with each dog 19 having contact surfaces 27 for the neighboring clamp rollers 25. Formed in one piece on the dogs 19 radially outside of the center of the clamp rollers and in facing relationship to the neighboring clamp rollers 25 are lugs 27a for engagement behind the clamp rollers 25 in circumferential direction. As shown in FIG. 2, the clearance in circumferential direction between the dogs 19 and their neighboring clamp rollers 25 is smaller than the clearance between the dogs 19 and confronting circumferential walls 28 of the valleys 22. FIG. 2 further illustrates within the sheet metal jacket 6 a polyhedral profile which is formed at the inner circumference of a radial collar 29 of the sheet metal jacket 6.

The clamp-type locking mechanism according to the invention operates as follows: When turning the driving element 5 relative to the fixed housing 1, the contact surfaces 27 of the dogs 19 come into contact upon the clamp rollers 25 and push them out of their clamping zone. Only one of the clamp rollers 25 of each pair of clamp rollers 25 associated to a plateau 21 is pushed away from the clamping track 3 and the clamping ramps 23, 24, i.e. the one or the other clamp roller 25, depending on the rotation direction of the driving member 5. The other clamp roller 25, which is still in a ready-to-clamp position, is thus prevented from effecting a clamping action because this clamp roller 25 rolls in the direction towards the other clamp roller 25 as a consequence of the rotation of the driving element 5 relative to the housing 1 and thus is no longer ready to clamp. After release of the clamp rollers 25, the dogs 19 ultimately impact against the confronting walls 28 of the sheet metal jacket 6, and a further rotation of the driving element 5 is now transmitted onto the driven element 4. When, however, a rotational motion is introduced to the driven element 4, the clamp rollers 25, which are already in a preparatory clamping stage, are increasingly captivated between the clamping ramps 23, 24 and the inner cylindrical clamping surface 3, thereby preventing a rotational motion of the driven element 4 relative to the housing 1.

Referring again to FIG. 1, there is shown that the clamp-type locking mechanism further includes a spring in the form of a ring 32 which is positioned between the housing 1 and the ring 20, and is made, preferably, of spring steel. The resilient ring 32 has an outer circumference provided with friction linings 34, as will be described in more detail with reference to FIGS. 3 and 4.

Figure 3:
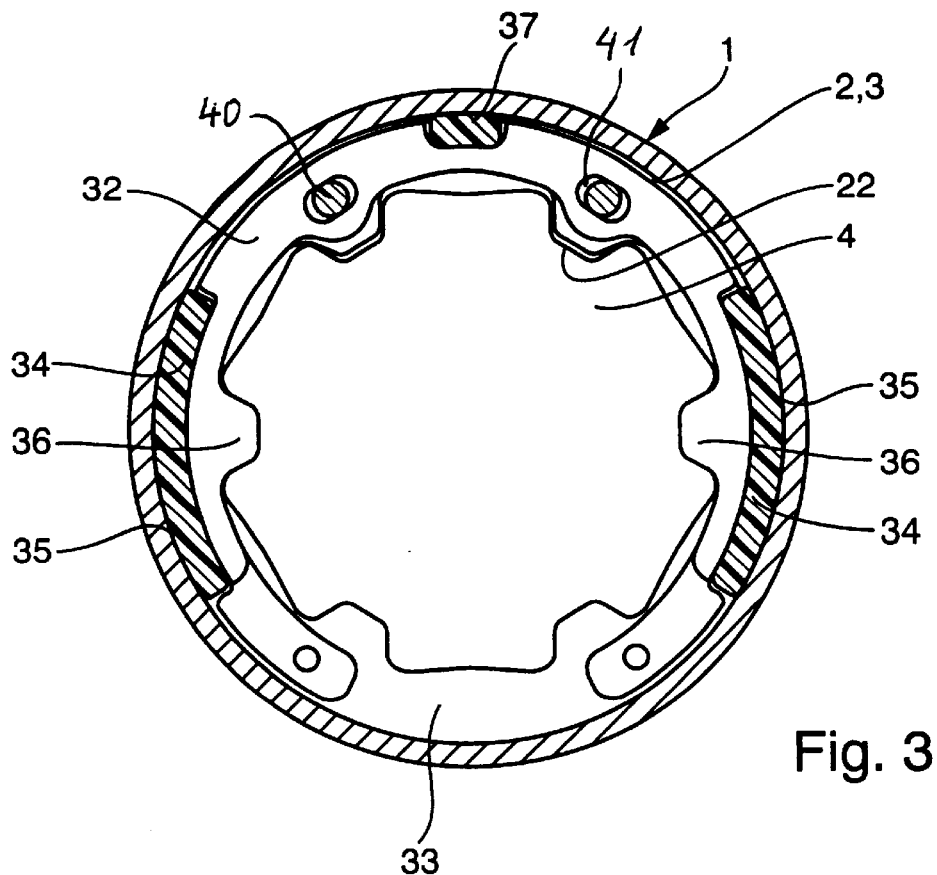
FIG. 3 is a cross sectional view of the clamp-type locking mechanism, taken along the line III—III in FIG. 1.

FIG. 3 shows a cross-section of the clamp-type locking mechanism, taken along the line III—III in FIG. 1. The ring 32 is breached to form an opening 33 between confronting ends of the ring 32 and is inwardly spring-biased to exhibit spring properties. The ring 32 supports about its circumference at two opposite areas friction linings 34 which have each a friction surface 35 urged by the ring 32 against the inner cylindrical clamping track 3. Extending inwardly from and spaced about the inner circumference of the ring 32 are a plurality of lobes 36 which positively engage the valleys 22 of the driven element 4. For realizing a correct centered disposition of the ring 32 and correct alignment of the friction linings 34 in the housing 1, the ring 32 is provided between the friction linings 34 with a centering cam 37 which is also supported by the inner cylindrical clamping track 3. The centering cam 37 is suitably formed in one piece with the friction linings 34 and secured to the ring 32 by pins 40 which latch in suitable bores 41 of the ring 32.

When the width of the friction lining 34 decreases as a result of wear, the biased ring 32 effects a self-adjustment of the friction lining 34, as the ring 32 presses the friction lining 34 against the confronting inner cylindrical clamping track 3, thereby ensuring a continuous contact pressure of the friction lining 34 against the clamping track 3.

Figure 4:
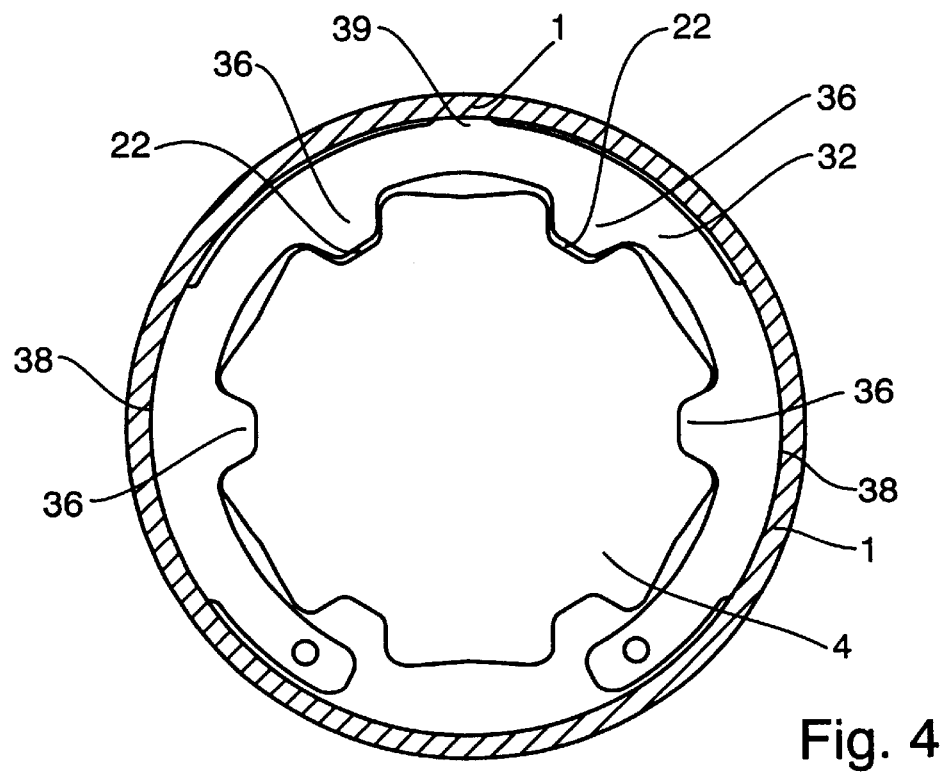
FIG. 4 is a cross sectional view of another embodiment of a clamp-type locking mechanism according to the present invention, having incorporated therein a variation of a friction device.

FIG. 4 is a cross sectional view of another embodiment of a clamp-type locking mechanism according to the present invention, having incorporated therein a modified friction device. In contrast to the configuration of FIG. 3, the ring 32 is now provided with a coating 38 and is formed in one piece with a centering cam 39 to realize a correct centered disposition of the ring 32 in the housing 1.

Persons skilled in the art will understand that the composition of the friction lining 34 according to the embodiment of FIG. 3, or the coating 38 according to the embodiment of FIG. 4, depends on the application at hand and is generally known to the artisan. Examples of suitable material may include POM (polyoxymethylene) or combination of POM with Teflon fibers, whereby the confronting bore wall of the housing 1 may then suitably be zinc-phosphatized.

While the invention has been illustrated and described as embodied in a clamp-type locking mechanism, it is not intended to be limited to the details shown since various modifications and structural changes may be made without departing in any way from the spirit of the present invention.

What is claimed as new and desired to be protected by Letters Patent is set forth in the appended claims:

What is claimed is:

1. A clamp-type locking mechanism, comprising:

a holding element defining a track;

a driven element rotatably arranged with respect to the holding element and having ramps which form with the track of the holding element clamping gaps;

spring-loaded roller means received in the clamping gaps;

an adjuster so interacting with the driven element as to be swingable to a limited extent with respect to the driven element and destined for rotation with the driven element, said adjuster having engagement members for moving the roller means out of their clamping gaps;

friction means positioned between the driven element and the holding element for transmitting a friction moment; and a spring mechanism for loading the friction means against the holding element.

2. The clamp-type locking mechanism of claim 1 wherein the spring mechanism includes a spring-loaded ring which is breached by an opening, said ring loading the friction means against the track of the holding element.

3. The clamp-type locking mechanism of claim 2 wherein the track has a cylindrical configuration.

4. The clamp-type locking mechanism of claim 2 wherein the ring has two diametrically opposite areas, said friction means having two friction elements received in the areas, whereby the friction elements and the areas are placed into one-to-one correspondence.

5. The clamp-type locking mechanism of claim 2 wherein the friction means is formed by a coating applied on a track-facing surface of the ring.

6. The clamp-type locking mechanism of claim 5 wherein the ring is made of spring steel.

7. The clamp-type locking mechanism of claim 2 wherein the friction means includes a friction lining applied onto the ring.

8. The clamp-type locking mechanism according to claim 2 wherein the ring includes between the opposite areas a centering cam which bears upon the track for centering the ring with respect to the track.

9. The clamp-type locking mechanism according to claim 8 wherein the centering cam is formed in one piece with the friction means for attachment to the ring.

* * * * *